United States Patent [19]

Gupta

[11] 3,976,269

[45] Aug. 24, 1976

[54] INTRINSICALLY TUNED STRUCTURAL PANEL

[75] Inventor: Gautam Sen Gupta, Bellevue, Wash.

[73] Assignee: The Boeing Company, Seattle, Wash.

[22] Filed: Dec. 19, 1974

[21] Appl. No.: 534,518

[52] U.S. Cl. .............................. 244/119; 29/191; 52/144; 52/629; 181/33 A; 181/33 G; 244/132
[51] Int. Cl.² ........................................ B64C 1/12
[58] Field of Search ............ 29/191; 244/119, 120, 244/123, 124, 126, 132; 181/33; 52/144, 145, 629

[56] References Cited
UNITED STATES PATENTS

| | | | |
|---|---|---|---|
| 2,581,625 | 1/1952 | Brady | 244/119 UX |
| 2,650,185 | 8/1953 | Larson et al. | 244/119 UX |
| 2,741,447 | 4/1956 | Heal | 244/119 |
| 2,819,032 | 1/1958 | Detrie et al. | 244/119 |
| 2,877,970 | 3/1959 | Albertine et al. | 244/119 |
| 3,058,704 | 10/1962 | Bergstedt | 244/119 |
| 3,071,217 | 1/1963 | Gould | 244/119 X |
| 3,159,249 | 1/1964 | Lazan | 244/119 X |
| 3,160,549 | 12/1964 | Caldwell et al. | 244/119 X |
| 3,771,748 | 11/1973 | Jones | 244/119 X |

OTHER PUBLICATIONS

"The Design of Structures to Resist Jet Noise Fatigue", Clarkson, The Journal of the Royal Aeronautical Society, vol. 66, No. 622, 10/62, pp. 603–616.

Primary Examiner—Arthur J. Steiner
Attorney, Agent, or Firm—Al Richardson; Bernard A. Donahue

[57] ABSTRACT

A structural panel of the skin-stiffener type, commonly used in aircraft construction, having significantly reduced vibration response, noise radiation and increased acoustic fatigue life, has a skin supported by uniformly spaced stiffeners which are located such that the fundamental natural frequencies of stiffener segments are equal to the fundamental natural frequency of skin sub-panels between the stiffener segments. The physical and geometric properties of the skin and stringers and the spacing of the stringers in various disclosed embodiments depend upon the trace velocity of the excitation field, loading conditions to which the panel is subjected, and end-conditions of the sub-panels and stiffeners.

7 Claims, 11 Drawing Figures

INTRINSICALLY TUNED STRUCTURAL PANEL

BACKGROUND OF THE INVENTION

This invention relates to a reinforced structural panel, and specifically, to a skin-stiffener panel having pre-determined vibration response characteristics.

In the past, many attempts have been made to reduce the vibration response of stiffened structures, such as those used in the construction of aircraft, ships and missiles. Structural panels in aircraft are subjected to numerous sources of excitation, such as boundary layer turbulence, jet noise, and vibrations transmitted directly from adjoining structures. Among the undesirable effects of such vibration are reduced fatigue life of the panel and excessive noise radiation.

In recent years, attention has been focused upon the minimization of so-called "coincidence peaks" in the vibration amplitude response and radiated noise spectra of aircraft fuselage structures. These coincidence peaks appear in the response spectra when the trace-velocity, or convection velocity, of a random pressure field acting on the panel coincides with the flexural wave speed in the skin at a particular frequency. The trace velocity is that velocity with which an incident pressure wave appears to travel along or parallel to the skin surface. When this condition occurs, the velocity of propagation of a particular component of the incident pressure field traveling parallel to the skin surface of the structure coincides with the flexural wave speed in the skin at a frequency called coincidence frequency. Two common examples of such a random pressure field to which aircraft structures are subjected are the high intensity noise emitted from the exhaust of a jet engine and the pressure fluctuations in a turbulent boundary layer. When the excitation field and the flexural waves are "in phase", large coincidence peaks appear at the coincidence frequency in the structural response and radiated noise spectra. Noise levels in the cabin interior and sonic fatigue life of the fuselage depend upon this coincidence excitation mechanism.

Previous attempts have been made to reduce vibrations of skin panels by the application of damping tapes directly on the skin. These tapes may be constrained or unconstrained, and may be applied in single or multiple layers. Another method of reducing panel vibration involves the use of rubber wedges or steel shims mounted on the skin near the frames or tear-strips in an aircraft fuselage to help reduce "edge mode" radiation in the skin. A third approach to the problem has involved the placing of small spring-mass systems on the skin panels midway between the stiffeners so that the spring-mass-skin system acts as a tuned damper unit. In a variation of this concept, foam rubber materials have been used to act as tuned dampers when excited in a thickness-resonance mode.

It has been found that increasing the number of damping tapes on the skin becomes less and less effective when the skin loss factor is increased beyond a certain level. It is yet to be demonstrated whether or not rubber wedges or metallic shims placed near the panel boundaries are more effective than damping tapes of equal weight applied over the whole panel surface. The use of tuned damper units has often resulted in excessive structural weight, and fatigue failure of the skin panel near the location of the tune damper has also been observed.

An object, therefore, of this invention is to provide a novel and improved structural panel having significantly reduced vibration response and radiated noise using known materials and assembly techniques without incurring excessive weight penalties.

Another object of this invention is to provide a novel structural panel of general utility having components which are intrinsically tuned to each other so that vibration response and radiated noise are minimized and the sonic fatigue life of the panel is significantly increased.

Another object of this invention is to define a novel structural panel in which skin thickness, stiffener cross-section and stiffener spacing are optimized for a given total structural weight so that vibration response and radiated noise are minimized.

BRIEF SUMMARY OF THE INVENTION

This invention provides for a structural panel having a skin which is supported by a uniformly spaced array of stiffeners attached thereto and spaced in such a way that fundamental flexural natural frequency of a portion of the panel bounded by stiffener segments, referred to herein as a sub-panel, is equal to the fundamental natural frequency of stiffener segments. According to this invention, the skin and stiffener components of a structural panel are intrinsically tuned to each other so that radiation of sound waves due to flexural waves in the skin is substantially reduced or eliminated.

In one embodiment of this invention, skin sub-panels are tuned to match bending-mode vibrations of adjoining stiffeners, and in another embodiment, torsional-mode oscillations of the stiffeners are matched. Another disclosed embodiment includes the use of damping means such as damping tape to increase the damping loss factor of the stiffeners.

DETAILED DESCRIPTION

The skin-stiffener panels commonly found in aircraft fuselages are reinforced by stringers which run longitudinally through the fuselage and frames which run circumferentially about the fuselage.

Figure 1:
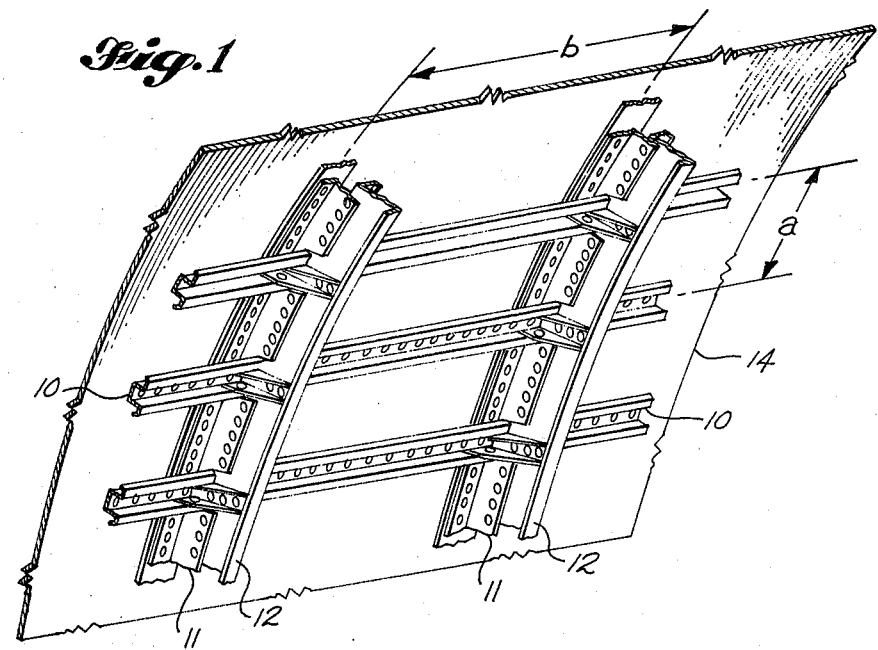
FIGS. 1 and 8 each show a section of a typical skin-stiffener panel as used in an aircraft fuselage.
Figure 8:
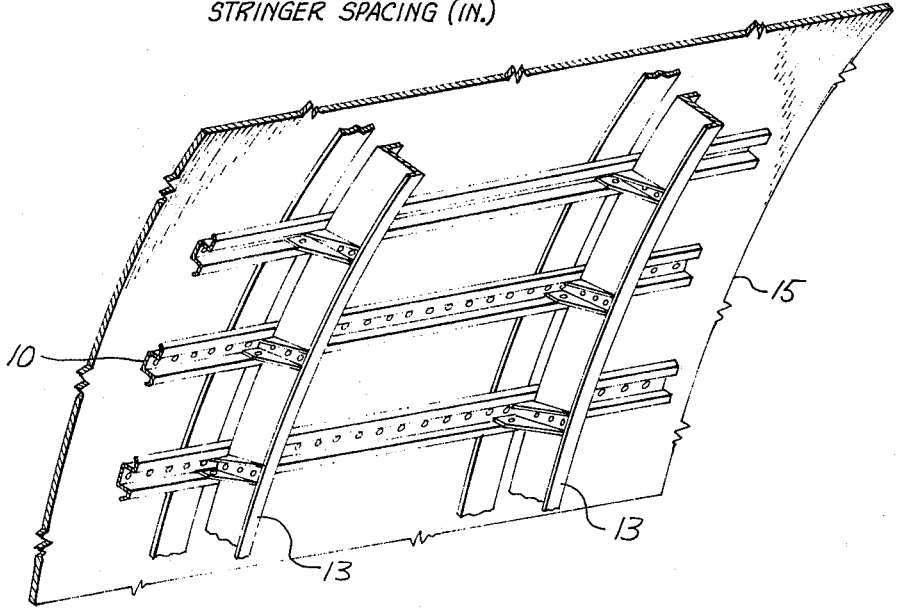

FIG. 1 shows a section of a typical such panel where the stringers 10 are spaced a distance $a$ apart, the frames 12 are spaced a distance $b$ apart, and the skin 14 is riveted to the stringers and frames. In FIG. 8 a similar panel section is shown where the frames 13 are not attached directly to the skin 15 and angles 11 of FIG. 1 have been removed.

The aft fuselage section of an aircraft with wing-mounted engines is frequently subjected to high noise levels from the engines, especially during take-off. This incident jet noise tends to generate complex structural wave motion in the fuselage skin. Under cruising conditions in flight, pressure fluctuations over the skin's surface caused by boundary layer turbulence also tend to generate wave motion in the structure. The resulting structural vibrations cause high noise levels in the cabin interior and may eventually cause fatigue failures to occur in the skin panels near the stringer attachment points.

The natural frequency of the curved, pressurized skin panels in the aft section of a typical jet transport with wing-mounted engines has been found to be in the neighborhood of 500 Hz to 600 Hz. It has also been found that peak interior noise in the aft section of the fuselage results primarily from jet noise. Further, jet noise has a trace velocity which is typically much higher than the speed of sound and is correlated over a large area. Therefore, it is convenient in analyzing panel vibrations due to jet noise excitation to represent it as an excitation field of random pressure fluctuations having infinitely large trace velocities along the skin with no decay of correlation.

Figure 2:
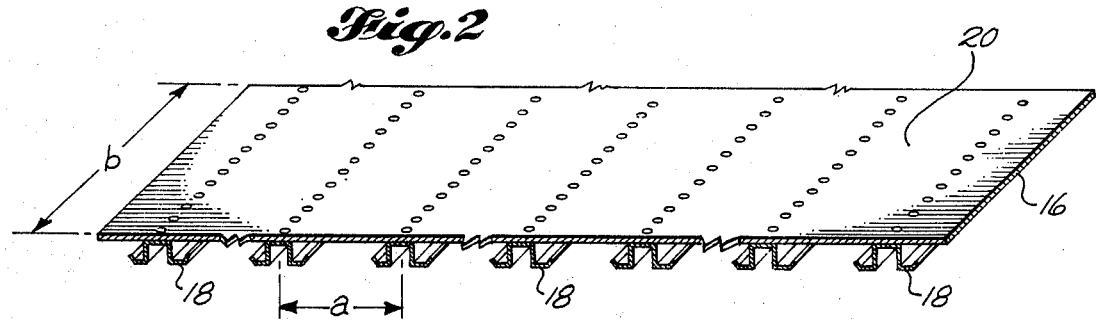
FIG. 2 shows a skin-stiffener model having uniformly spaced stiffeners.

In a typical fuselage skin-stiffener panel, the frames are considerably more rigid than the stringers. When the skin is directly attached to the frames as well as the stringers, the panels on either side of each frame tend to vibrate independently of each other, whereas adjacent panels bounded between two frames are strongly coupled and tend to vibrate as a group rather than as isolated panels. A representative structural model of such a group of circumferentially adjacent panels is shown in FIG. 2. The panel is composed of a skin 16 and a number of parallel, equally spaced stringers 18 attached to the skin by rivets or other means. Occasionally in this disclosure, that portion of the skin 20 which is bounded by adjacent stiffeners and frames, in this case a rectangular section having sides of lengths $a$ and $b$, is referred to as a sub-panel. Also, adjoining sub-panels are occasionally referred to collectively as a panel or a structural panel.

Figure 3:
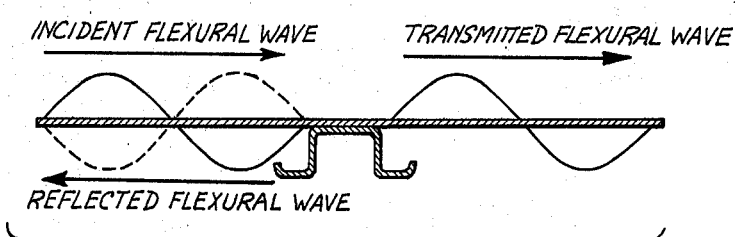
FIG. 3 illustrates the reflection and transmission of flexural waves in the skin at the point of attachment of a stiffener.

When a flexural or bending wave in the skin meets a discontinuity in the structure such as a stringer, part of the wave is transmitted to the next panel, part is absorbed by the stringer in bending and rotation, and the remainder is reflected back into the panel as illustrated in FIG. 3. The amounts of wave energy absorbed and reflected by the stringer depend upon the stiffness of the stringer in bending and torsion. At the coincidence frequency, $F_c$, the waves reflected by any two adjacent stringers reinforce each other, and the amplitude of vibrations in the sub-panel between the two stringers increases to a large value. For an excitation field having an infinite trace velocity, the coincidence frequency is close to the fundamental flexural natural frequency of the sub-panel, assuming it to have clamped edges at the stringers and simply supported edges at the frames. Under this sort of excitation, the adjacent panels vibrate in phase and the stringers do not rotate. The wave reflection process is not affected by the stringer rotational stiffness $K_r$, but is influenced by the stringer bending stiffness $K_t$. The stringer bending stiffness is related to the material and geometric properties of the stringer and its flexural vibration frequency by the following equation:

$$K_t = EI_b(\pi/b)^4 - pA (2\pi f)^2 \qquad \text{(Equation No. 1)}$$

where:

$E$ = Young's modulus for the stringer material;
$p$ = density of the stringer material;
$I_b$ = area moment of the stringer cross-section in bending;
$A$ = stringer cross-sectional area;
$b$ = frame spacing; and
$f$ = frequency of stringer oscillation in bending.

If the stringer is assumed to be simply supported at the frames, it vibrates like a simply supported beam of length $b$ having a fundamental flexural natural frequency $F_{sb}$ given by the equation:

$$F_{sb} = \frac{1}{2\pi} \left( \frac{E}{p} \right)^{1/2} \left( \frac{I_b}{A} \right)^{1/2} \left( \frac{\pi}{b} \right)^2 \qquad (2)$$

From equation (1) it can be seen that if the stringer is vibrating at $F_{sb}$, $K_t = 0$. If both the stringers and the panel are vibrating at this frequency, the presence of the stringers is not felt by the skin and the panel responds as a continuous, stringerless structure in the circumferential direction. Under this condition, there is no wave reflection from the stringers, so the skin response reduces to a small value. However, if the stringer natural frequency and the sub-panel natural frequency differ substantially, the stringers either appear too stiff or too massive to the panel and there is a substantial reflection at the stringers, resulting in a large response at the panel natural frequency.

Therefore, if the dimensions of the stringers and the panel are chosen such that the fundamental natural frequency of the stringer acting as a beam equals the fundamental flexural natural frequency $F_{cs}$ of the panel with edges clamped along the stringers and simply supported along the frames, the stringers will not offer any impedence to the bending waves propagating at $F_{cs}$, and the skin response will reduce to a small value.

The expression for $F_{cs}$ is known to be:

$$F_{cs} = \frac{\pi t}{2b^2} \left[ \frac{E'}{12p'(1-\nu^2)} \right]^{1/2} \left[ \left\{ 1 + (1.506)^2 \left( \frac{b}{a} \right)^2 \right\}^2 - 2.04 \left( \frac{b}{a} \right)^2 \right]^{1/2} \qquad (3)$$

where:

$E'$ = Young's modulus for the skin material;
$p'$ = density of the skin material;
$t$ = skin thickness;
$\nu$ = Poisson's ration for the skin material;
$a$ = frame spacing; and
$b$ = stringer spacing Thus, by equating $F_{sb}$ from equation (2) to $F_{cs}$ from equation (3) and rearranging terms into a more convenient form we find that:

$$\left(\frac{E}{p}\right)\left(\frac{I_b}{A}\right) = \frac{t^2}{12(1-\nu^2)}\left(\frac{E'}{p'}\right)\left[\left\{1+(1.506)^2\left(\frac{b}{a}\right)^2\right\}^2 - 2.04\left(\frac{b}{a}\right)^2\right] \quad (4)$$

If the skin and stringers are made of the same material, equation (4) simplifies to:

$$\left(\frac{I_b}{A}\right) = \frac{t^2}{12(1-\nu^2)}\left[\left\{1+(1.506)^2\left(\frac{b}{a}\right)^2\right\}^2 - 2.04\left(\frac{b}{a}\right)^2\right] \quad (5)$$

These two equations relate the essential geometric and material properties of a flat, unpressurized skin-stiffener panel that is intrinsically tuned to minimize panel response to a random pressure field due to jet noise having a very high trace velocity as previously discussed. Groups of panels so constructed can be placed along the aft fuselage of the jet aircraft having wing-mounted engines in order to reduce structural response to the intense noise generated by the engines during take-off. Under these conditions the trace velocity of the excitation field will be quite high and the fuselage skin will not be exposed to significant pressure differentials between the inside and outside of the fuselage.

Equation No. 1 for $K_t$ is based on the assumption that the stringers are simply supported at the frame location. If the stringers are fully fixed, the proper expression for $F_{sb}$ is:

$$F_{sb} = \frac{R}{2\pi}\left(\frac{E}{p}\right)^{1/2}\left(\frac{I_b}{A}\right)^{1/2}\left(\frac{\pi}{b}\right)^2 \quad (6)$$

where $R = (1.506)^2 = 2.268$ for the fundamental mode. The tuned skin-stringer panel in this case should be designed to satisfy the following equation:

$$\left(\frac{E}{p}\right)\left(\frac{I_b}{A}\right) = \frac{t^2}{R^2 \times 12(1-\nu^2)}\left(\frac{E'}{p'}\right)\left[\left\{1+(1.506)^2\left(\frac{b}{a}\right)^2\right\}^2 - 2.04\left(\frac{b}{a}\right)^2\right] \quad (7)$$

where $R$ is a factor which depends on the stringer end conditions.

In a practical design, the stringers are neither simply-supported nor fully fixed at the frames, but the choice of the factor R (where 1 ≤ R ≤ 2.268) for any specific structure can be quickly determined by those skilled in the art.

In developing the foregoing equations, it has also been assumed that the skin sub-panels are simply-supported at the frames. In practice, the frames may or may not be directly attached to the skin as FIG. 8 shows. Even when the frames are "shear-tied" to the skin, the skin edges on the frames are neither simply-supported no fully fixed. However, for most practical constructions with ($b/a$) equal to or greater than 2, the panel natural frequencies are influenced very little by the panel boundary conditions at the frames, and assumption of simply-supported boundary conditions at the frames should generally give a good estimate of the panel natural frequency.

Figure 4:
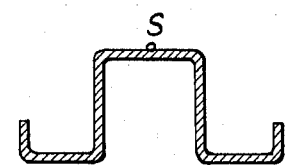
FIG. 4A is a cross-section of a stiffener with constrained damping treatment.
FIG. 4B is the cross-section of a boron-epoxy reinforced stiffener.
FIG. 4C is the cross-section of a fiber-reinforced composite stringer.

In some cases, the trace velocity of the excitation field acting on the skin may be low enough that there is a coincidence excitation of "stringer torsion" mode of the stiffener panel. This type of excitation can arise from the random pressure field in the turbulent boundary layer flowing over the fuselage of an aircraft flying at a high subsonic speed. In this situation where the stringer torsion mode of the panel is strongly excited, the wave form in the skin panels in such that skin deflections at the stringers are negligible and the effect of stringer bending stiffness $K_t$ is no longer significant. The skin instead induces torsional oscillations in the stringers and the transmission of these oscillations across the stringers depends largely on the stringer torsional stiffness, $K_r$. The expression for $K_r$ is:

$$K_r = EW\left(\frac{\pi}{b}\right)^4 + GC\left(\frac{\pi}{b}\right)^2 - pI_s(2\pi f)^2 \quad (8)$$

where:
$W$ = warping constant of the stringer cross-section about the point of skin contact (shown as point $s$ in FIG. 4);
$E$ = Young's modulus of the stringer material;
$b$ = stringer spacing;
$G$ = shear modulus of the stringer material;
$C$ = St. Venant's constant for uniform torsion of the stringer;
$I_s$ = the polar moment of the stringer cross-section about point $s$ (as in FIG. 4);
$f$ = frequency of stringer torsional oscillation.

This equation shows that $K_r$ is frequency-dependent and equals zero when the stringer is oscillating at the frequency:

$$F_{st} = \frac{1}{2\pi}\left[\left(\frac{E}{p}\right)\left(\frac{W}{I_s}\right)\left(\frac{\pi}{b}\right)^4 + \left(\frac{G}{p}\right)\left(\frac{C}{I_s}\right)\left(\frac{\pi}{b}\right)^2\right]^{1/2} \quad (9)$$

In order to "tune" a panel subjected to coincidence excitation at or near the fundamental stringer torsion mode frequency of the stiffened panel, the fundamental flexural natural frequency of the skin panel must be made equal to the frequency at which $K_r$ equals zero. In this situation it can be assumed that the skin panel behaves as a panel with all four edges simply supported, so that the expression for its fundamental flexural natural frequency is:

$$F_{nt} = \frac{\pi}{2}\left[\left(\frac{E'}{p'}\right)\left(\frac{t^2}{12(1-\nu^2)}\right)\left(\frac{1}{a^2}+\frac{1}{b^2}\right)^2\right]^{1/2} \quad (10)$$

where:

$E'$ = modulus of elasticity of the skin panel material;
$p'$ = density of the skin material;
$t$ = thickness of the skin;
$\nu$ = Poisson's ratio of the skin material;
$a$ = stringer spacing;
$b$ = frame spacing.

Then by equating $F_{st}$ from equation (9) to $F_{ss}$ from equation (10), we have an expression which relates the geometric and material properties of a flat unpressurized skin-stringer panel which is intrinsically tuned to minimize response to excitation by a random pressure field which tends to excite stringer torsion mode of the stiffened panel.

In some cases, the trace velocity of the excitation field acting on the skin may be such that a panel mode having a frequency higher than the fundamental frequency is strongly excited. In these cases, the stringers should be tuned to that higher mode panel frequency. Again, in some cases the stringers can be designed to act as tuned wave dampers in any of their overtone modes, if necessary.

Figure 4A:
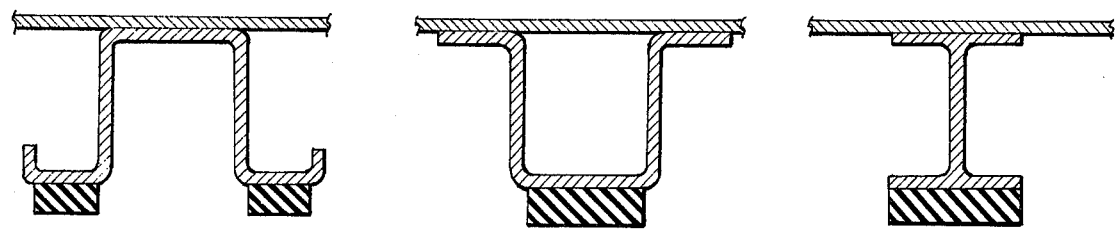
Figure 4B:
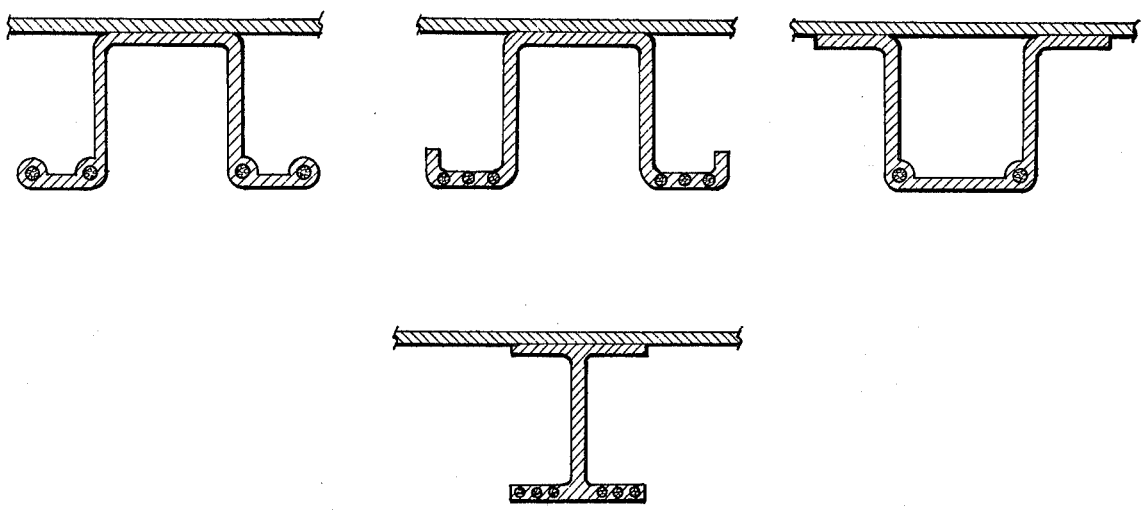
Figure 4C:
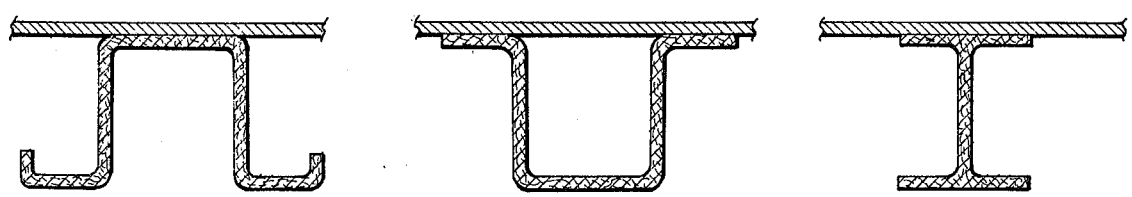

It is inherent in a tuned panel that a higher degree of energy is transferred from the skin to the stringers than in a similar untuned structure. Accordingly, it is necessary that in most applications of this concept some means must be provided for damping stringer oscillations to prevent unnecessary reduction in stringer fatigue life. Four common ways known to those skilled in the art to improve the stringer damping loss factor are illustrated in FIGS. 4A, 4B, 4C, and 4D. FIG. 4A illustrates the application of visco-elastic damping treatment to stringer flanges. One possible improvement of this treatment involves the application of constrained or tuned damping treatment to the flange. In FIG. 4B, various ways are shown to incorporate boron-epoxy fibers longitudinally within the stringers to increase damping. FIG. 4C shows typical cross-sections of stringers constructed entirely of fiber-reinforced composites.

Obtaining best results from a tuned panel requires the application of optimum damping treatment to the stringers. With most practical structures, this can be achieved with the proper application of damping tape alone and stringer loss factors between 0.10 and 0.5 should be expected.

In order to demonstrate the dynamic behavior of a tuned structural panel, a computer program was written to compare the response of two flat, unpressurized panels, one tuned and the other untuned, to a random pressure field having a very high trace velocity. For this analysis an optimum stringer loss factor of 0.35 was used and it was assumed that the skin loss factor was 0.01, which is typical for the skin along. In the untuned panel it was assumed that the fundamental flexural natural frequency of the stringer was 40% of the flexural fundamental natural frequency of the panel. It was further assumed for both panels that the trace velocity of the excitation field was infinite.

In order to obtain results which would provide a meaningful comparison, the geometry of the untuned panel was used as a basis for the design of the tuned panel. The "tuning" of the untuned panel was accomplished by assuming that the skin thickness and the stringer area moment remained constant and by reducing the stringer cross-sectional area until equation (4) was satisfied.

Figure 5:
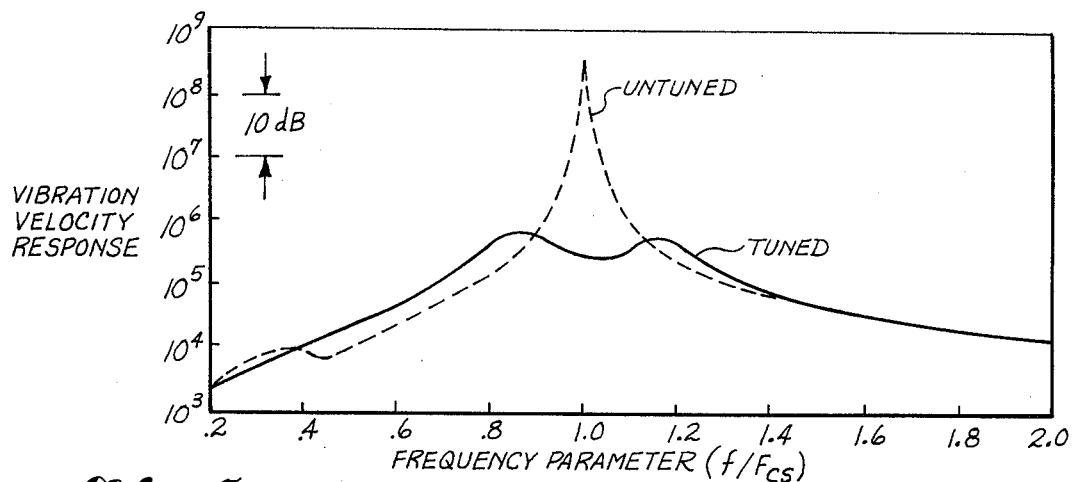
FIG. 5 illustrates the computed effect of intrinsic structural tuning on the velocity response at the center of a model structural panel.
Figure 6:
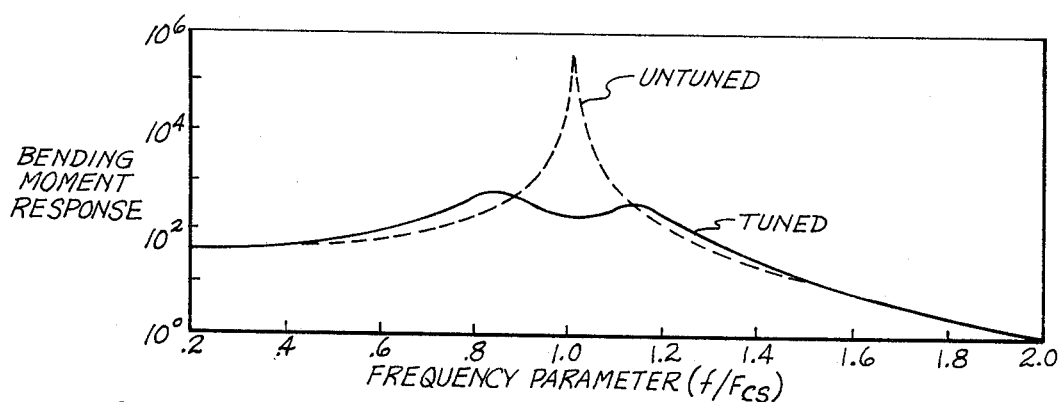
FIG. 6 illustrates the computed effect of intrinsic structural tuning on the skin bending moment or stress response near the stiffener location in a model structural panel.

Since the stringer area moment remained constant, the tuned structure had the same static bending stiffness as the untuned one. The tuning process described here would be useful in a case where the critical design condition for the panel involved static bending loads. Of course, the tuning process to be used depends upon the critical design condition for the panel, and the proper tuning process for given design condition should be obvious to those skilled in the art. The particular responses of the tuned and untuned panels are shown in FIGS. 5 and 6. FIG. 5 illustrates the effect of intrinsic structural tuning on the velocity response of the panel at its center. FIG. 6 shows a comparison of the maximum bending moment or stress response in the skin quite close to the stringer location. Both figures show an impressive 29 db reduction in response as a result of intrinsic tuning. Also, the tuned stringer was estimated to weigh only about one-sixth as much as the untuned stringer.

Results of this analysis also show that intrinsic tuning produced a reduction in the RMS value of the stress response of the panel skin by a factor of four, both at its center and near the stringer locations. Such a reduction in stress levels in aluminum alloy panels could yield an increase in the panel's fatigue life by a factor of one thousand.

Figure 7:
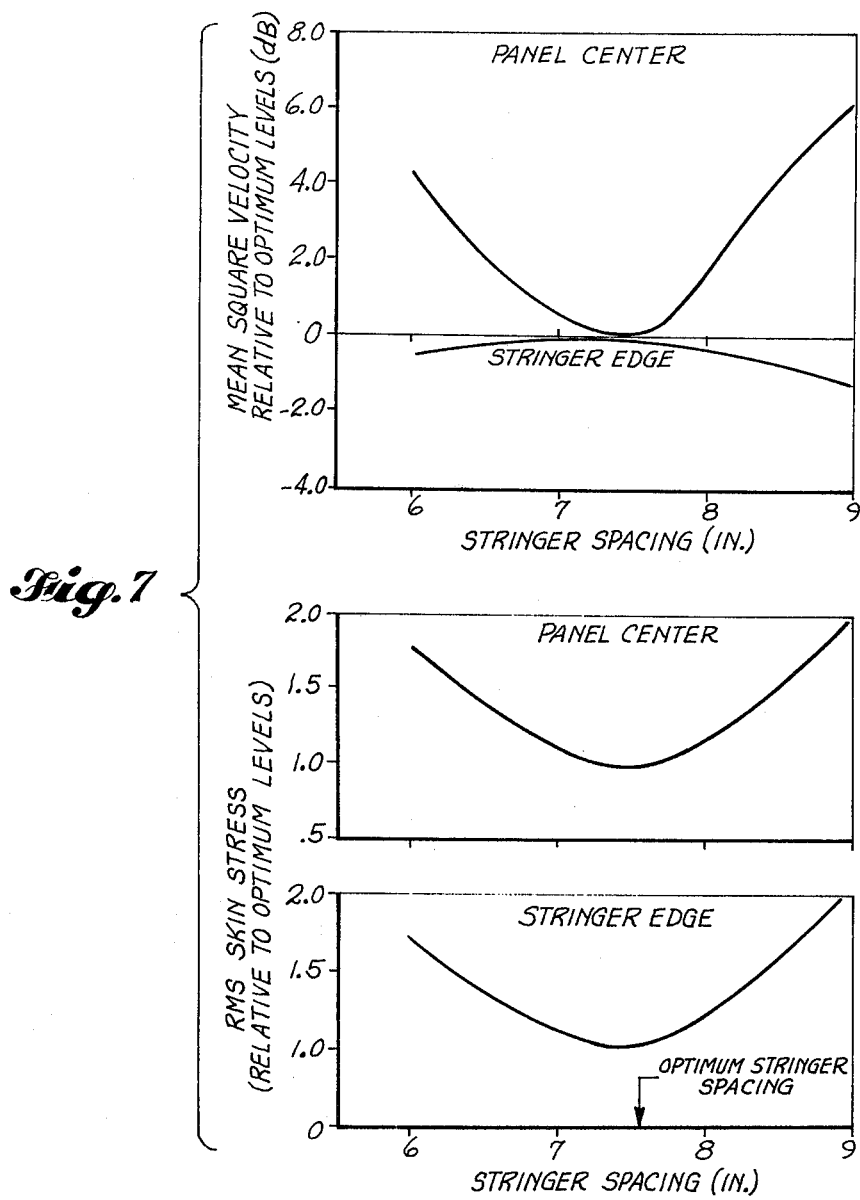
FIG. 7 illustrates the use of intrinsic structural tuning to obtain optimum stringer spacing for which the computed skin panel velocity response and stress response are minimum.

In another study, the stringer cross-sectional area, skin thickness, and frame spacing were kept constant and the stringer spacing was varied. The tuning condition was satisfied at a particular stringer spacing. FIG. 7 shows the computed reduction of mean square skin velocity response and the skin RMS stress when an optimum stringer spacing was used.

In addition, due to the substantial reduction in velocity response at the center of a tuned panel, the tensile load on the rivets or fasteners attaching the panel to the stringers caused by inertial loading of the skin is correspondingly reduced. Thus, in a tuned panel, the total number of rivets can be reduced or smaller rivets can be used while still satisfying static requirements.

In the foregoing discussion it is implied that a tuned structural panel according to this invention must exactly satisfy the relationships given. Theoretically, proper structural tuning does demand that these relationships be satisfied, but in practice a panel may be built according to this invention and yet deviate to some degree from these exact requirements. In some instances, because of other structural requirements, it may be difficult to satisfy the tuned condition exactly. Nonetheless, this invention is useful in this situation because a substantial reduction in panel response can be achieved even where the stiffener fundamental natural frequencies are allowed to vary from the panel fundamental natural frequencies by as much as 20%. Also it has been stated that optimum damping treatment of the stringers is desirable, but in practice, variations in stiffener damping up to approximately 50% from optimum can be allowed.

Also it should be noted that the preferred embodiments described herein are flat rectangular panels not to be subjected to pressurization loads. Normally, however, the fuselage of a modern jet transport aircraft is pressurized, and the skin stringer panels making up the fuselage are subjected to various combinations of axial, bending and shear loads. The effect of pressurization loads on the fundamental flexural natural frequency of the skin panels is not insignificant and must be taken into account in designing a tuned panel. If the radius of the curvature of the panel is large, the effects of the curvature on its dynamic behavior can usually be ignored, whereas if the radius is small, the curvature must be taken into account. Ordinarily, the effects of other loads not resulting from pressurization can be ignored in calculating the natural frequencies of the panel. The effect of pressurization or any other in-plane loads on the stringer natural frequency is generally insignificant. The various methods of calculating the fundamental flexural natural frequencies of curved and pressurized panels are well known to those skilled in the art.

It is also possible using the teachings of this disclosure to reduce low frequency interior noise in an aircraft cabin which is a serious problem in all commercial aircraft. Overall cylindrical modes of vibration of the fuselage structure must be considered. Calculation of the fundamental (lowest) natural frequency of the cylindrical shell between two successive frame locations taking into account the effects of pressurization is well known to those skilled in the art. Then, reduction in this low frequency interior noise and structural vibration can be accomplished by tuning the fundamental frequency of the cylindrical shell between two successive frame locations to the flexural or torsional fundamental frequency of the frame stiffener considered as a ring.

A further application of the teachings of this disclosure is possible in the construction of an optimum fuselage structural configuration having minimum noise radiation and structural response. In this optimum configuration, the fundamental frequency of the portion of the stringers in between two successive frames is tuned to the fundamental frequency of the skin sub-panel bounded by stringers and frames, and also the fundamental frequency of the frame considered as a ring is tuned to the fundamental frequency of the cylindrical skin segment bounded by two successive frames.

This invention can be used in yet another important situation. Rib-skin construction consisting of a skin stiffened by a set of uniformly spaced ribs is commonly used in the tail plane, control surface and wing box of an aircraft. In many cases, such structures are subjected to intense broadband fluctuating random pressure loading. In a design study of such a structure, the response of a tuned rib-skin structure in which the fundamental frequency of the skin sub-panel bounded by two successive ribs was equal to the fundamental frequency of the ribs, was computed. It was observed that the response of the skin panel attained a minimum value when the skin was tuned to the ribs to which an optimum damping treatment was applied.

By combining known methods with this disclosure, it is possible to build intrinsically tuned curved skin stringer panels for use in a pressurized aircraft structure or a comparable application which is equivalent to the embodiments shown herein. Accordingly, it will be understood that obvious changes and modifications to the invention described may be made by those skilled in the art to which this invention pertains without departing from the spirit and scope of the invention as set forth in the claims appended hereto.

What is claimed is:

1. A structural panel comprising:
   a skin of uniform thickness, and;
   an orthogonal network of uniformly spaced stiffeners attached to said skin and dividing said skin into a plurality of sub-panels, the fundamental flexural natural frequency of a sub-panel vibrating as a diaphragm being substantially equal to the fundamental natural frquency of an adjoining stiffener vibrating in bending in a plane normal to the skin.

2. A structural panel comprising:
   a skin having
   a modulus of elasticity $E'$,
   a Poisson's ratio $\nu$,
   a mass density $p'$, and
   a thickness $t$;
   a pair of stiffeners attached to said skin and spaced apart a distance $b$;
   a plurality of stiffeners attached to said skin, spaced apart a distance $a$, each oriented approximately at right angles to each of said pair of stiffeners, and each having
   a cross-sectional area A,
   a cross-sectional area moment in bending $I_b$,
   a modulus of elasticity E, and
   a mass density $p$;
   wherein $$\left(\frac{I_b}{A}\right)\left(\frac{E}{p}\right) \text{approximately equals} \quad \frac{1}{R^2}\left(\frac{E'}{p'}\right)\frac{t^2}{12(1-\nu^2)}\left[\left\{1+(1.506)^2\left(\frac{b}{a}\right)^2\right\}^2 - 2.04\left(\frac{b}{a}\right)^2\right]$$

and where R is a constant which ranges in value from 1.000 to 2.268.

3. A structural panel having reduced noise radiation characteristics comprising:
   a pair of adjacent stiffeners uniformly spaced apart a distance $b$;
   a plurality of stiffeners, each spaced apart a distance $a$, each attached to and oriented substantially at right angles to each of said pair of adjacent stiffeners, and each having a segment of length $b$ extending between said pair of adjacent stiffeners and having the same fundamental flexural natural frequency F; and,
   a skin of uniform thickness attached to each of said pair of said plurality of stiffeners to form a plurality of sub-panels, each of width $a$ and length $b$, and each having a fundamental natural frequency F, when vibrating as a diaphragm, substantially equal to the fundamental flexural natural frequency F of the said segments of said plurality of stiffeners.

4. A structural panel having reduced noise radiation characteristics for use on an aircraft fuselage comprising:
   two adjacent frames;
   a plurality of equally spaced stringers, each attached to said frames and each having segments of equal length extending between said frames and each segment having the same fundamental flexural natural frequency F; and, a skin of uniform thickness attached to said frames and said stringer segments to form a plurality of sub-panels, each bounded by said frames and a pair of adjacent stringers, and each having a fundamental natural frequency F when vibrating as a diaphragm substantially equal to the fundamental flexural natural frequency F of the stringer segments.

5. A structural panel having reduced noise radiation characteristics for use in an aircraft fuselage structure having stringers and frames comprising in combination:
two adjacent frames;
a plurality of equally spaced stringer segments, each extending between said attached to said frames, and each having the same fundamental flexural natural frequency F; and,
a skin of uniform thickness extending over and attached to said frames and stringer segments to form a plurality of sub-panels, each bounded by said frames and two adjacent stringer segments, and each having a fundamental natural frequency F, when vibrating as a diaphragm, substantially equal to the said fundamental natural frequency F of the stringer segments.

6. A structural panel having reduced noise radiation characteristics for use in an aircraft fuselage structure having stringers and frames comprising in combination:
two adjacent frames;
a plurality of equally spaced stringer segments, each extending between and attached to said frames, and each having the same fundamental flexural natural frequency F; and,
a skin of uniform thickness extending over and attached to said frames and stiffener segments to form a plurality of sub-panels, each bounded by said frames and two adjacent stiffener segments, and each having a fundamental natural frequency F when vibrating as a diaphragm within 20 percent of the fundamental flexural natural frequency F of the stiffener segments.

7. In combination with an aircraft fuselage of the type having a series of annular-shaped frames spaced lengthwise along the fuselage, stringers attached to the frames and running lengthwise along the fuselage and skin panels covering the frames and stringers to form the outer surface of the fuselage, the improvement which comprises:
two adjacent frames;
a plurality of equally spaced stringers, each attached to said frames, each having a segment extending between said frames, and each of said segments having the same fundamental natural frequency F when vibrating in the bending mode;
a skin of uniform thickness attached to each of said frames and stringers to form a plurality of rectangular sub-panels, each having a fundamental natural frequency F, when vibrating as a diaphragm, substantially equal to the fundamental natural frequency F of the stringer segments.

* * * * *